(12) United States Patent
Tanaka

(10) Patent No.: US 6,738,966 B1
(45) Date of Patent: May 18, 2004

(54) COMPILING DEVICE, COMPUTER-READABLE RECORDING MEDIUM ON WHICH A COMPILING PROGRAM IS RECORDED AND A COMPILING METHOD

(75) Inventor: Akira Tanaka, Yawata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 633 days.

(21) Appl. No.: 09/612,028

(22) Filed: Jul. 7, 2000

(30) Foreign Application Priority Data

Jul. 9, 1999 (JP) .......................................... 11-195717

(51) Int. Cl.[7] ................................................ G06F 9/45
(52) U.S. Cl. ...................... 717/140; 717/136; 717/151; 717/153; 717/154
(58) Field of Search ................................ 717/156, 153, 717/140, 144, 157, 147, 142, 151, 136; 712/238

(56) References Cited

U.S. PATENT DOCUMENTS

| | | | | |
|---|---|---|---|---|
| 5,355,494 A | * | 10/1994 | Sistare et al. | 717/154 |
| 5,428,793 A | * | 6/1995 | Odnert et al. | 717/157 |
| 5,613,117 A | * | 3/1997 | Davidson et al. | 717/144 |
| 5,642,512 A | * | 6/1997 | Tanaka et al. | 717/153 |
| 5,659,753 A | * | 8/1997 | Murphy et al. | 717/147 |
| 5,790,862 A | * | 8/1998 | Tanaka et al. | 717/159 |
| 5,815,719 A | | 9/1998 | Goebel | |
| 5,836,014 A | * | 11/1998 | Faiman, Jr. | 717/156 |
| 5,842,021 A | * | 11/1998 | Odani et al. | 717/159 |
| 5,881,288 A | * | 3/1999 | Sumi et al. | 717/125 |
| 5,978,905 A | * | 11/1999 | Takayama et al. | 712/238 |
| 6,243,864 B1 | * | 6/2001 | Odani et al. | 717/154 |
| 6,286,135 B1 | * | 9/2001 | Santhanam | 717/146 |
| 6,651,247 B1 | * | 11/2003 | Srinivasan | 717/161 |

OTHER PUBLICATIONS

TITLE: Global Predicate Analysis and its Application to Register Allocation, author: Gilles et al, IEEE, 1996.*
Exploiting Short–lived Variables, authr: Lozano et al, IEEE, 1995.*

* cited by examiner

Primary Examiner—Chameli Chaudhuri Das

(57) ABSTRACT

Formal parameters which are to use registers are replaced with variables generated inside a compiler. Then, if a variable allocated to a register has a live range (lifetime) that includes an inline assembly subroutine, the variable is allocated a register that differs from the registers updated during the inline assembly subroutine,

12 Claims, 20 Drawing Sheets

BACKGROUND ART

FIG. 1A

```
int f(int p){
   int a,b,c,d;
   . . . . . . . .
   c=a / b;
   d=a % b;
   . . . . . . . .
}
```

FIG. 1B

```
. . . . . . . .
mov r2,r4
div r3,r4        (1) DIVISION
mov r2,r5
div r3,r5        (2) REMAINDER CALCULATION
mov mdr,r5
. . . . . . . .
```

FIG. 1C

```
. . . . . . . .
mov r2,r4
div r3,r4
mov mdr,r5
. . . . . . . .
```

FIG. 1D div rm,rn··· DIVIDE REGISTER rn BY REGISTER rm, STORE THE DIVISION RESULT IN rn, AND THE REMAINDER IN SPECIAL REGISTER mdr.

BACKGROUND ART

FIG. 2A
```
int f(int p){
    int a,b,c,d;
    ........
    asm mov a,r0 ;
    asm mov b,r1 ;
    asm div r1,r0 ;
    asm mov r0,c ;
    asm mov mdr,d ;
    ........
}
```

FIG. 2B
```
........
mov r2,r0
mov r3,r1
div r1,r0
mov r0,r4
mov mdr,r5
........
```

BACKGROUND ART

FIG. 3A

```
#define  dm(x,y,z,w)¥
         asm    mov x,r0 ;¥
         asm    mov y,r1 ;¥
         asm    div r1,r0 ;¥
         asm    mov r0,z ;¥
         asm    mov mdr,w
```

FIG. 3B

```
int f(int p){
    int a,b,c,d;
    ………
    dm(a,b,c,d);
    ………
}
```

FIG. 3C

```
int f(int p){
    int a,b,c,d,e;
    ………
    a=p + b;    (1)
    ………
    dm(a,b,c,d);
    ………
```

FIG. 3D

```
int f(int p){
    int a,b,c,d,e;
    ………
    e=a − 10;   (2)
    ………
    dm(a,b,c,d);
    ………
    g=p + 10;
    ………
}
```

FIG. 8

```
#define   dm(x,y,z,w)¥
    asm    mov x,v_r0 ;¥        ⎫
    asm    mov y,r1 ;¥          ⎬ content of
    asm    div r1,r0 ;¥         ⎬ macro
    asm    mov r0,z ;¥          ⎭ definition
    asm    mov mdr,w
. . . . . . . .

int f(int p){
  int a,b,c,d;
. . . . . . . .
  a=p + b + 10;
. . . . . . . .
  dm(a,b,c,d);   (1)
. . . . . . . .
  e=a + 20;
. . . . . . . .
  g=p + 30;
. . . . . . . .
  h= c;
. . . . . . . .
  i= d + h;
. . . . . . . .
}
```

FIG. 9

```
. . . . . . . . . . . . . . . .
int f(int p){
  int a,b,c,d;
  . . . . . . . .
  a=p + b + 10;
  . . . . . . . .
  asm mov a,r0 ;  ⎫
  asm mov b,r1 ;  ⎪
  asm div r1,r0 ; ⎬ (1)
  asm mov r0,c ;  ⎪
  asm mov mdr,d ; ⎭
  . . . . . . . .
  e=a + 20;
  . . . . . . . .
  g=p + 30;
  . . . . . . . .
  h= c;
  . . . . . . . .
  i= d + h;
  . . . . . . . .
}
. . . . . . . . . . . . . . . .
```

FIG. 10

........
i50:Function f
........
i1: t1 = p + b;
i2: a = t1 + 10;
........
i3: asm mov a,r0 ;  ⎫
i4: asm mov b,r1 ;   ⎪
i5: asm div r1,r0 ;  ⎬ (1)
i6: asm mov r0,c ;   ⎪
i7: asm mov mdr,d ;  ⎭
........
i8: e= a + 20;
........
i9: g= p + 30;
........
i10: h= c;
........
i11: i= d + h;
........
i51:Function End
........

INTERMEDIATE PROGRAM

i50:Function f i20: t2=p;

........

i1: t1=t2 +b;

i2: a =t1+10;

........

i3: asm mov a,r0 ;  ⎫
i4: asm mov b,r1 ;  ⎪
i5: asm div r1,r0 ; ⎬ (1)
i6: asm mov r0,c ;  ⎪
i7: asm mov mdr,d ; ⎭

........

i8: e=a + 20;

........

i9: g=t2 + 30;

........

i10: h= c;

........

i11: i= d + h;

........

i51:Function End

........

INTERMEDIATE PROGRAM

FIG. 12A

..........
i50: Function f
i20: t2 = p;

..........
i1: t1 = t2 + b;
i2: a = t1 + 10;

..........
i3: asm  mov a,r0 ;
i4: asm  mov b,r1 ;
i5: asm  div r1,r0 ;
i6: asm  mov r0,c ;
i7: asm  mov mdr,d ;

..........
i8: e = a + 20;

..........
i9: g = t2 + 30;

..........
i10: h = c;

..........
i11: i = d + h;

..........
i51: Function End

..........

INTERMEDIATE PROGRAM

LIVE RANGES

FIG. 13

| asm INTERMEDIATE INSTRUCTIONS | DEFINED REGISTER |
|---|---|
| ... | ... |
| i3 | r0 |
| i4 | r1 |
| i5 | r0, mdr |
| i6 | — |
| i7 | — |
| ... | ... |

EXAMPLE CONTENT OF asm REGISTER HOLDING UNITS 18 AND 28

```
i20: t2=p;
........
i1: t1=t2 +b;
i2: a =t1+10;
........
i3: asm mov a,r0 ;
i4: asm mov b,r1 ;
i5: asm div r1,r0 ;
i6: asm mov r0,c ;
i7: asm mov mdr,d ;
........
i8: e=a + 20;
........
i9: g=t2 + 30;
........
i10: h= c;
........
i11: i= d + h;
........
```

INTERMEDIATE PROGRAM

LIVE RANGES

FIG. 18

| VARIABLE | LIVE RANGE |
|---|---|
| t1 | i1,i2 |
| t2 | i1,i2,··,i3,i4,i5,i6,i7,··i8,··i9 |
| a | i2,··,i3,i4,i5,i6,i7,··i8 |
| b | ··i1,i2,··i3,i4 |
| c | i6,i7,··i8,··i9,i10 |
| d | i7,··i8,··i9,··i10,··i11 |
| e | i8,··i9,··i10,··i11,·· |
| g | i9,··i10,··i11,·· |
| h | i10,··i11 |
| i | i11·· |
| p | ··i20 |

INTERFERENCE GRAPH CORRESPONDING
TO FIG 13

COMPILING DEVICE, COMPUTER-READABLE RECORDING MEDIUM ON WHICH A COMPILING PROGRAM IS RECORDED AND A COMPILING METHOD

This application is based on an application No. 11-195717 filed in Japan, the content of which is hereby incorporated by reference.

BACKGROUND OF THE INVENTION

1. Field of the Invention

The present invention relates to a compiling device translating a source program into an object program such as a machine language program or an assembler program, and in particular, to improvements achieved when the source program includes a section written in high-level programming language and a section written in assembly language.

2. Description of the Background Art

Recent developments in high-performance integrated microprocessors have led to such microprocessors being used in information processing devices performing multimedia processing such as communication, video processing and audio processing.

The design of programs used in multimedia processing has become increasing unwieldy, so that problems regarding the development cost, maintenance and portability of such programs have multiplied in recent years. Consequently, there is a great demand for developmental environments using high-level programming languages, of which C and C++ have become particularly popular. However, a look at the current state of affairs regarding developmental environments for multimedia processing reveals that multimedia processing is often written using assembly language, which is close to machine language. This seems to go against the prevailing demand for developmental environments written in high-level programming language. Sections of the program that are frequently executed and require a short execution time are written in assembly language. Such sections form the bulk of the mass data processing functions occurring in multimedia processing.

There are several reasons for writing sections of the program in assembly language. First, the translation ability of the compiler is limited. In addition, microprocessors have some machine language instructions which achieve a plurality of functions. Such instructions are increasingly found as multimedia processing instructions, and cannot be efficiently written in high-level programming language, nor be efficiently translated into machine language instructions by the compiler.

Suppose that the microprocessor targeted by the compiler uses a load/store method (a method in which addressing of operands is performed using only transfer instructions as memory-to-memory calculation instructions), and a division instruction div is as shown in FIG. 1D. In FIG. 1D, the division result is stored in a register rn, and a result of remainder calculation in a register mdr. This means that the division instructions used in a majority of microprocessors can perform division and remainder calculation simultaneously using one instruction.

In contrast, when the high-level programming language C is used, and the division and remainder results of variables a and b are to be set respectively as variables c and d, this process can only be written as shown in FIG. 1A. As a result, many compilers generate separate div instructions for each of '/' calculation and '%' calculation, as shown in FIG. 1B, (1) and (2). Conventionally, execution of a div instruction requires a greater number of execution cycles than other instructions, so that ideally only one div instruction should be used to perform simultaneous division and remainder calculation, as shown in FIG. 1D. In FIGS. 1B and 1D, registers r2, r3, r4 and r5 are allocated to variables a, b, c and d respectively, and 'mov rm, rn' signifies that the value in register rm is to be transferred to register rn.

Consequently, in the case of most C compilers, a programmer uses asm statements as extended language specifications, so that program description written in C is mixed with description written in assembly language. The example program sections shown in FIG. 1 may be written as assembler statements following the keyword asm, as shown in FIG. 2. Here, parts of the asm statements written using variables at a level equivalent to C may be written into registers and memory allocated by the compiler. For example, if registers r2, r3, r4 and r5 are allocated to variables a, b, c and d respectively, as in FIG. 1, the output of the compiler is as shown in FIG. 2B. FIG. 2B has two more transfer instructions than the ideal situation of FIG. 1D but, since it has only one div instruction, requires less execution time than FIG. 1B. In addition, if conventional copy propagation is optimized (this technique is described in reference 1, listed later in this specification) for FIG. 2B, the program section shown there can be changed to one similar to FIG. 1D.

Furthermore, if it is desirable to insert instructions capable of performing both division and remainder calculation at a plurality of places in the program, a macro is defined as in FIG. 3A, and if this macro is used as shown in FIG. 3B efficiency is increased. Furthermore, the descriptor is the same kind as that used to call a function, so the program becomes easier to read. Note that FIG. 3B shows a situation in which a microprocessor targeted by a C language compiler replaces x, y, z and w with a, b, c and d, as in FIG. 2A. Replacement of variables by a C compiler in this way is known as macro generation. Descriptors that are macro-defined assembler statement sequences having a special function, such as dm in FIG. 3A, are known as 'inline assembly routines'.

However, if inline assembly routines are used in a conventional compiler, a programmer needs to carry out first and second check operations (described below). As a result, programmers are somewhat reluctant to include inline assembly routines when programming.

The program includes a plurality of variables. When a value of a certain variable x is valid for an entire inline assembly routine, the first check operation involves thoroughly checking the object program generated by the compiler to determine whether the value of the variable x has been destroyed. A register r is allocated to the variable x by a process performed by the compiler, so that if the inline assembly routine defines the register r, the value of the register r will differ before and after the inline assembly routine.

Suppose, as shown in FIG. 3C, that a value for a variable a defined at definition point (1) is used at use point (2) and variable a has a live range which extends over the inline assembly routine dm. A register r1 is allocated to the variable a, and if the value of register r1 is changed during the inline assembly routine dm, a value of a which differs from that defined at definition point (1) will be used at use point (2) in FIG. 3C.

In the second check operation, the programmer makes a careful check to determine whether values of parameters have been destroyed, after determining how such values are defined by the inline assembly routine.

In some parameters, values are transferred using specified registers r. The live ranges of such parameters may extend over the inline assembly routine. Here, if a register r is defined by the inline assembly routine, the value of the parameter will be different before and after the inline assembly routine. For example, if, as in FIG. 3D, a parameter p is referenced after the use point of the inline assembly routine dm, and the parameter p is passed to a register r0, it is clear that the value of the register r0 will be destroyed by the inline assembly routine dm, and the value used when the parameter p is referenced will be inaccurate.

These kinds of checks generally create a heavy workload for the programmer, and in an attempt to lighten this burden, many programmers write programs including various restrictions. For example, programmers only use inline assembly routines for functions including variables that can definitely be judged as being allocated to memory or a specified register prior to compiling (global variables and the like). In addition, registers used by parameters are not defined in the inline assembly routine.

Programmers would ideally like to express what were originally independent functions as an inline assembly routine, and use such routines to increase effectiveness, but the above described restrictions hamper such efforts. As a rule, a programmer must use the first and second check operations to determine how the inline assembly routine has been defined. This means that it is difficult for the programmer to use the inline assembly routine with no knowledge of its detailed content, as is necessary when dealing with so-called black boxes (that is programs/program sections whose operational code is confidential or otherwise unknown). Accordingly, it is difficult to increase the reusability of inline assembly routines by changing them into library routines.

SUMMARY OF THE INVENTION

A first object of the present invention is to provide a compiling device that translates a program without requiring the programmer to make checks when an inline assembly routine is used.

A second object of the present invention is to provide a compiling device that translates a program so as to enable inline assembly routines to be inserted as black boxes.

A third object of the present invention is to provide a compiling device enabling inline assembly routines to be changed to library routines, thereby increasing the reusability of the program.

As described above, the present invention is a compiling device that translates a program including statements using variables into an object instruction sequence. Assembler instructions defining values for resources are arranged in a section of the program. The compiling device includes a variable detecting unit for detecting variables whose live ranges overlap the section from variables having values defined in the statements, and a resource allocating unit for allocating to each variable detected by the variable detecting unit, a resource different from the resources having values defined in the assembler instructions.

This means that the programmer is not obliged to make checks when an inline assembly routine is used. Since these conventional checks are no longer necessary, assembler statements and inline assembly routines can be written at arbitrary positions in the program. Using inline assembly routines actively in this way improves the execution speed and reusability of the program.

In this invention, the program may be embodied by a plurality of functions, the statements are included in the functions, and assembler instructions are included at least one of the functions. Here, the compiling device further includes a register parameter replacing unit that, when formal parameters that should use registers exist, (1) generates substitution instructions for substituting temporary variables for the values of each formal parameter used in the functions, and inserts each of the generated substitution instructions at the start of a corresponding function, and (2) replaces all of the formal parameter values in the functions with the temporary variables indicated by the substitution instructions. Furthermore, the variable detecting unit detects temporary variables whose live ranges overlap the section; and the resource allocating unit allocates a register different from the registers whose values are defined in the assembler instructions to each detected temporary variable.

Here, a register that has been allocated to a parameter is no longer incorrectly updated in the assembly statements, and the same applies to variables whose live ranges span the assembler statements. This means that inline assembly routines can be freely defined, and used as a black box at an arbitrary position in the program. Using inline assembly routines actively in this way improves the execution speed and reusability of the program.

The variable detecting unit may also include a detecting unit for detecting assembler instructions from the program, a temporary variable generating unit for generating, when assembler instructions are detected, temporary variables already allocated to resources defined in the assembler instructions, a live range setting unit setting the live range of each generated temporary variable to be equal to the section where the assembler instructions are arranged; and a variable detecting unit detecting variables whose live range overlaps the live range set for the temporary variables. Here, the resource allocating unit allocates a resource different from the resources allocated to the temporary variables to each of the detected variables.

Allocated temporary variables are generated from the assembler statements, and resource allocation is performed using a method that integrates these generated temporary variables. In addition the resource allocation method disclosed in reference 2, which actively limits the generation of transfer instructions, and the resource allocation method disclosed in reference 3, which is an expansion method of the widely known graph coloring technique, may be applied.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 1A–1D shows an example program, a corresponding assembler program, a comparative assembler program, and an illustration of a division instruction;

FIGS. 2A–2B shows an example asm statement sequence, and corresponding assembler program;

FIGS. 3A–3D shows examples of inline assembly routine definitions and inline assembly routine uses;

FIG. 8 shows an example of a program written in a high-level programming language;

FIG. 9 shows a program after execution performed by a macro expanding unit 11;

FIG. 10 shows an intermediate program after execution performed by a syntax analyzing unit 12;

FIG. 11 shows an intermediate program after execution performed by the register parameter replacing unit 16;

FIGS. 12A–12B shows an intermediate program and live ranges corresponding to an example program;

FIG. 13 shows an example of content held in asm defining register holding units 18 and 28;

FIG. 18 shows a basic data structure for expressing live ranges; and

DESCRIPTION OF THE PREFERRED EMBODIMENTS

Figure 4:
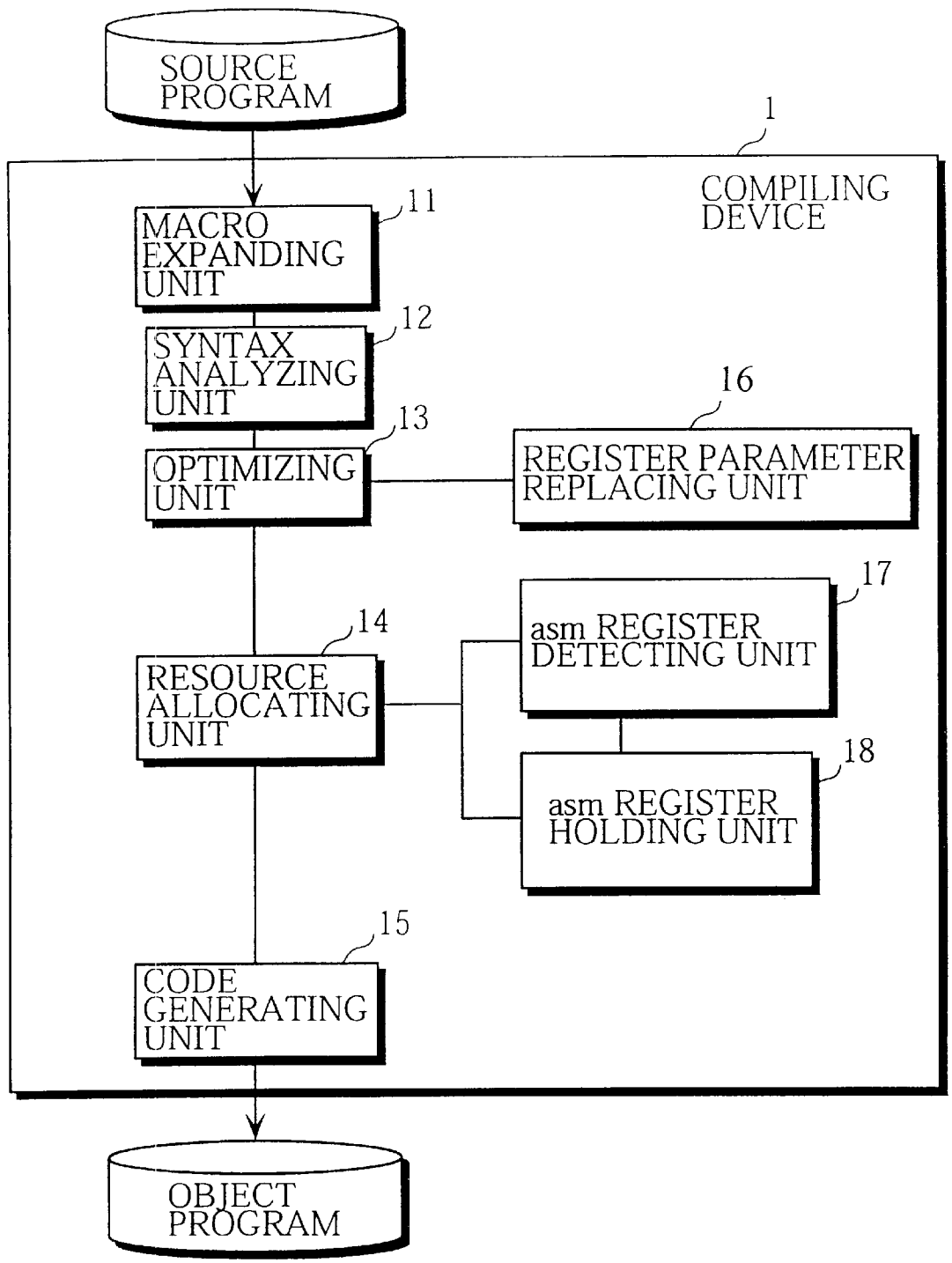
FIG. 4 is a block diagram of a compiling device 1 in a first embodiment.

Prior to the description of the embodiments, a description of related references and terminology will be made.

References

1. *Compilers: Principles, Techniques and Tools.* By Alfred V. Aho, Ravi Sethi and Jeffrey D. Ullman. Addison Wesley, 1986.
2. Japanese Patent Application No. 10-344524: A Resource Allocation Apparatus and A Computer-Readable Recording Medium on which a Resource Allocating Program is Recorded. Akira Tanaka.
3. *Modern Compiler Implementation in Java.* By Andrew W. Appel. Cambridge University Press, 1998.

Terminology

Definition, Referencing and Use of Variables

Setting the value of a variable is described as 'defining', and using the set value as 'referencing'. When variables are defined and referenced in a program this is described as 'using'. Unless a particular distinction needs to be made, the following explanation treats formal parameters in the same way as variables.

Temporary Variable

A variable generated by the compiler to temporarily store a calculation result, thereby simplifying processing, is known as a 'temporary variable'. The following explanation treats such variables in the same way as variables written in a standard source program, unless a particular distinction needs to be made.

Intermediate Instruction

In order to simplify processing, the compiler converts source program code into code known as 'intermediate code', and one step of the intermediate code is known as an 'intermediate instruction'. Intermediate instructions are for example quadruples or triples, and are converted to generate a final object program. Furthermore, when the source program is converted to a sequence of intermediate instructions, these are known collectively as an 'intermediate program'. FIG. 10 shows one example of an intermediate program corresponding to the program in C shown in FIG. 9. This program is expressed in three address code, which is one of the quadruples. Also in FIG. 10, references i1, i2 and the like, formed from 'i' and an attached number, represent identifiers (names) of intermediate instructions. To be more specific, the expression 'a=p+b+10' in FIG. 9 is divided into two intermediate instructions i1 and i2 in FIG. 10, through the use of a temporary variable t1. Furthermore, the asm statements of FIG. 9, (1) are converted into intermediate instructions (FIG. 10, (1)) having the same format as FIG. 9, (1). The intermediate instructions for the asm statements in FIG. 10 (1) will be known as 'asm intermediate instructions'. Note that in the embodiments, intermediate instructions having other formats may also be used in addition to the format shown here. Furthermore, in order to simplify processing performed by the compiler, the intermediate program is also equipped with intermediate instructions showing specified program ranges, such as intermediate instructions indicating the start and end of the intermediate program and the start and end of functions. In FIG. 10, for example, intermediate instructions i50 and i51 show the start and end of a function.

Basic Block

When there are no jumps from or to an intermediate instruction sequence, and the sequence is executed in a fixed order, it is known as a 'basic block'. A detailed description of basic blocks may be found in reference 1.

Live Range

Figure 12B:
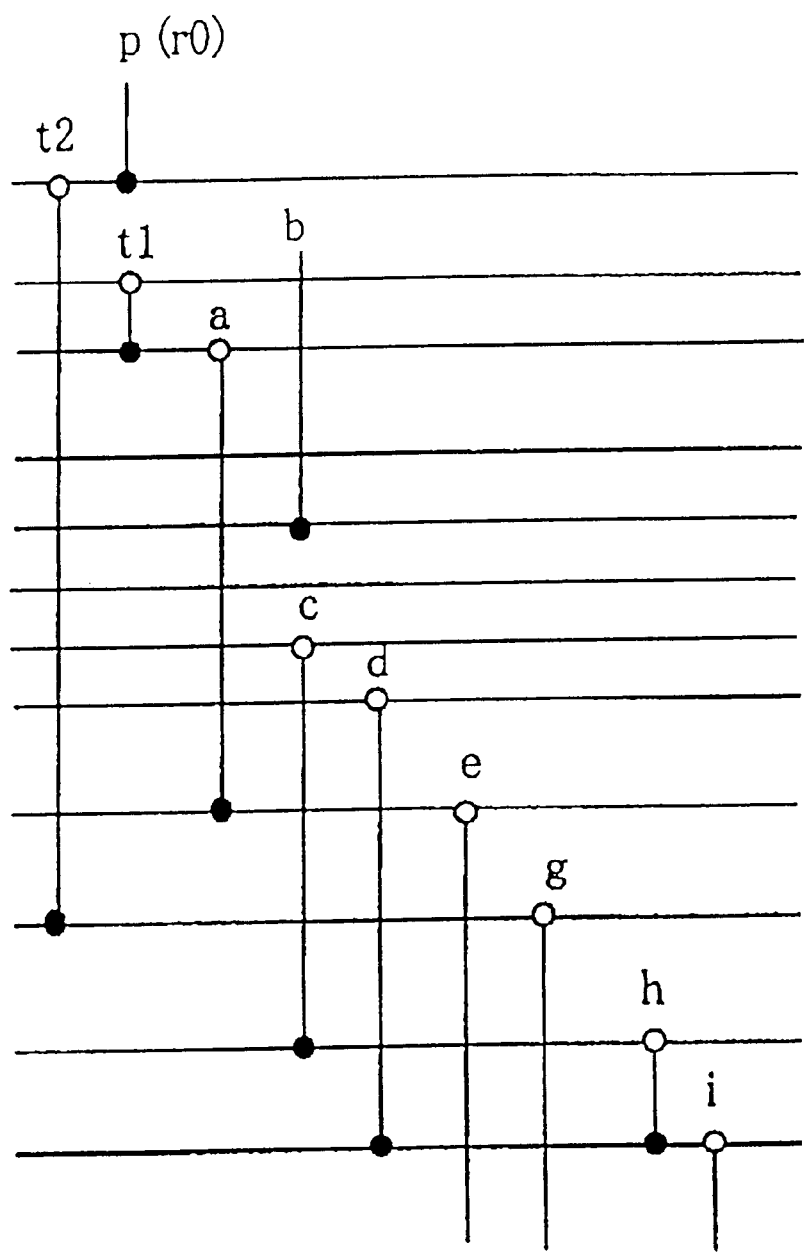

Live ranges are sections during which values stored in each variable are valid, each live range actually representing the section of a program from an intermediate instruction defining a value for a variable until an intermediate instruction which last references the defined value. Consequently, a live range can be expressed by the set of intermediate instructions included in this section. Here, the intermediate instruction defining the value for the variable corresponds to the start point of the live range and the intermediate instruction last referencing the defined value to the end point of the live range. The areas occupied by the intermediate instruction sets are used to determine whether live ranges overlap. Thus, when the end point of one live range is identical to the start point of another live range, the two live ranges do not overlap. FIG. 12B shows examples of live ranges. In the drawing, live ranges are represented by solid vertical lines. The start point of each live range is shown by a white dot and the end point by a black dot. FIG. 18 shows the actual structure of data representing the live ranges in FIG. 12B, with the live range of each variable shown by an intermediate instruction set. In FIG. 18, the symbol '. . .' shown in various live ranges, indicates the presence of an intermediate instruction not shown in the drawing. Live ranges may also be referred to as 'lifetimes' or 'extents'. A more detailed definition and actual examples of live ranges are given in references 1 and 2.

Allocation of Resources to Variables

This refers to the allocation of registers and memory to variables. Since it is impossible to hold more than one value in a particular register or memory region during the same section of a program, the same register or memory region cannot be allocated to variables with overlapping live ranges, and it is essential to allocate different registers or memory regions to such variables. For example, the live ranges of variables a and b in FIG. 12 overlap, so these variables need to be allocated different registers or memory regions. Registers and memory are hereafter referred to collectively as 'resources'.

First Embodiment

FIG. 4 is a block diagram of a compiling device 1 in a first embodiment. The compiling device 1 is formed from the main components of a conventional compiler, such as a macro expanding unit 11, a syntax analyzing unit 12, an optimizing unit 13, a resource allocating unit 14, and a code generating unit 15, along with a register parameter replacing unit 16, an asm register detecting unit 17, and an asm register holding unit 18 which bear a particular relationship to this embodiment.

The following is an explanation of the operation and function of each component, with reference to the drawings.

The macro expanding unit 11 is the first component to be activated by the compiling device 1, and replaces macro-defined macro identifiers with their actual content. This processing is basically the same as that performed by a conventional C compiler, so explanation here is limited to describing an example processing result.

FIG. 8 shows an example source program. Here, a macro identifier dm (x,y,z,w) that macro-defines an inline assembly routine that performs division and remainder calculation as described in the background art, and a function f that uses this dm are shown. The part of the function f relevant to the explanation given in this embodiment has been extracted and written in the drawing. FIG. 9 shows an intermediate program resulting from processing of the source program of FIG. 8 performed by the macro expanding unit 11. As shown in FIG. 9 (1), the macro identifier dm is replaced by the macro-defined inline assembly routine.

FIG. 9, (1) is composed of five assembler instructions: mov a,r0, mov b,r1, div r1,r0, mov r0,c and mov mdr,d. The keyword asm is attached to the front of each of these instructions. This asm keyword signifies that the statement shown between the keyword and a concluding semi-colon includes an assembler instruction. This kind of statement is known as an assembler statement. Such statements indicate to the compiling device 1 that translation processing equivalent to that used for the sections of the program written in a high-level programming language is not necessary. As a result, the syntax analyzing unit 12 and the optimizing unit 13 in the compiling device 1 skip processing of statements that start with the keyword asm.

Following the completion of processing by the macro expanding unit 11, the syntax analyzing unit 12 is activated, and performs lexical analysis, syntax analysis and semantic factoring, thereby converting the source program to an intermediate program. As one example, the source program of FIG. 9 is converted to the intermediate program shown in FIG. 10. The operation of the syntax analyzing unit 12 is not the focus of this embodiment and so a more detailed description is omitted. At this point, assembler statements which have had a keyword asm attached and been expanded inside the source program by the macro expanding unit 11 are inherited directly by the converted intermediate program without being changed into different code by the syntax analyzing unit 12. This means that assembler statements having the attached keyword asm exist in the intermediate program as intermediate instructions.

Once the processing performed by the syntax analyzing unit 12 has been completed, the optimizing unit 13 optimizes the intermediate program so as to minimize the size and processing time of the object program finally generated by the compiling device 1. The operation of the optimizing unit 13 is not the focus of this embodiment and so a detailed description is omitted, with only those points relevant to the embodiment being explained. In order to perform optimization, the optimizing unit 13 performs basic block analysis, control flow analysis and data flow analysis. Basic block analysis is performed by dividing the intermediate program into basic blocks. Then control flow analysis is performed by analyzing the control flow between basic blocks. After this, data flow analysis is performed by analyzing where each variable is defined and referenced within each basic block. The resource allocating unit 14 (explained later in this specification) uses the results of this analysis to calculate live ranges. Note that when register parameters are included in the program to be translated, the optimizing unit 13 is activated following activation of the register parameter replacing unit 16. Here, optimization performed by the optimizing unit 13 enables assembler statements having an attached keyword asm to be inherited directly by the intermediate program without being replaced by a different code, and without being deleted.

Figure 5:
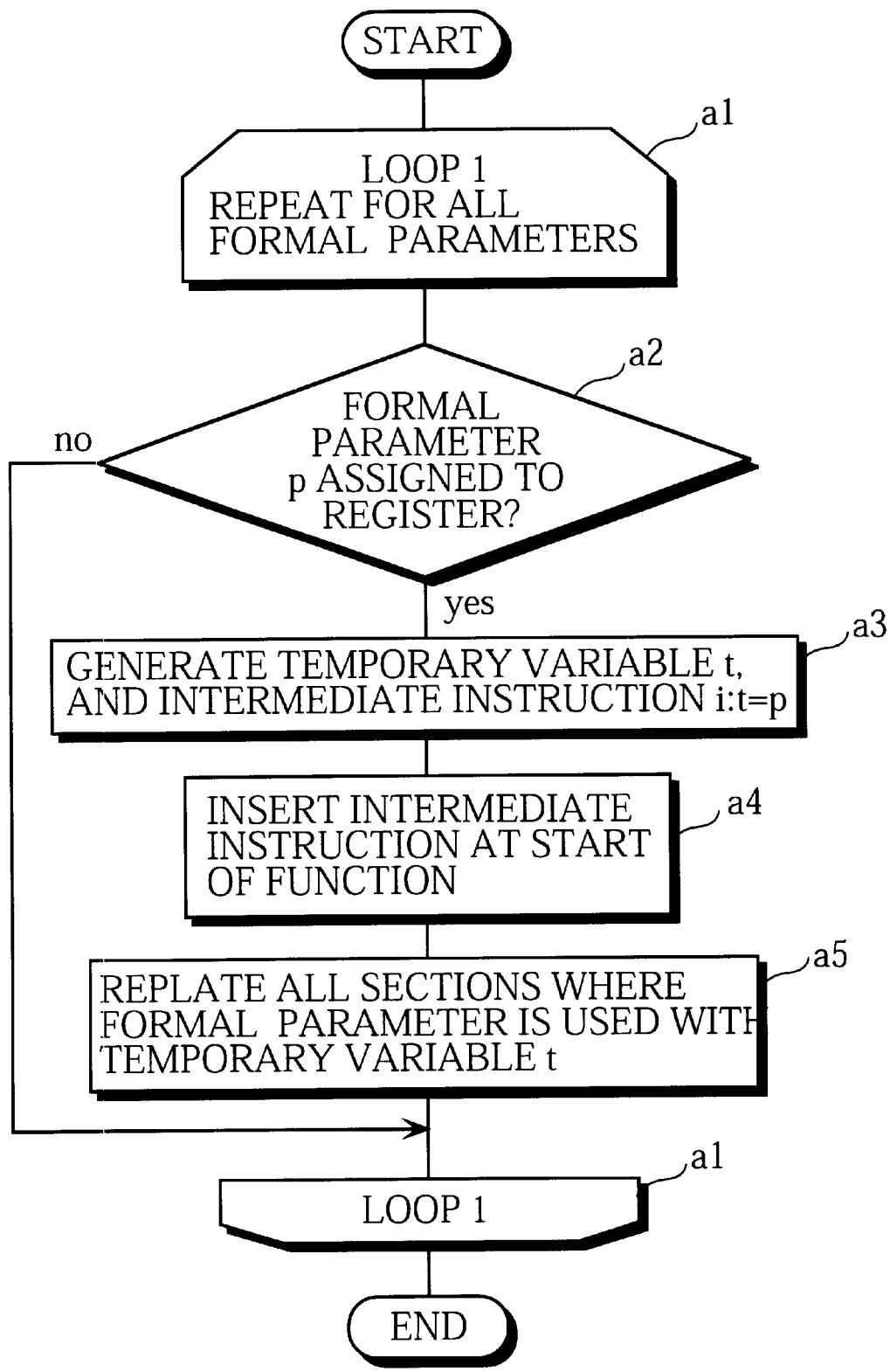
FIG. 5 is a flowchart of processing performed by a register parameter replacing unit 16.

The register parameter replacing unit 16 is activated if register parameters are included in the program that is to be translated. The register parameter replacing unit 16 inserts, at the start of a function, an intermediate instruction storing, as a temporary variable, a value of a formal parameter passed to the register. Further to this, the register parameter replacing unit 16 replaces the sections of the intermediate program in which the formal parameter is used with the temporary variables. FIG. 5 is a flowchart showing the processing performed by the register parameter replacing unit 16.

At step a1, the register parameter replacing unit 16 repeats the processing of steps a2 to a5 for all formal parameters p, and when all the formal parameters p have been processed, the processing performed by the register parameter replacing unit 16 is completed.

At step a2, if a formal parameter p has been passed to a register, the register parameter replacing unit 16 performs steps a3 and a4.

At step a3, the register parameter replacing unit 16 generates a new temporary variable t and then an intermediate instruction i:t=p showing that the formal parameter p should be replaced by the temporary variable t.

At step a4, the register parameter replacing unit 16 inserts the generated intermediate instruction i at the start of the function.

At step a5, the register parameter replacing unit 16 replaces all the sections of the intermediate program where the formal parameter p is used with the temporary variable t, and returns to step a1.

The following is an explanation of an actual example of operations performed by the register parameter replacing unit 16, with reference to the example shown in FIG. 11. FIG. 11 shows the result of processing performed by the register parameter replacing unit 16 on the intermediate program in FIG. 10. The register parameter replacing unit 16 fetches a formal parameter p passed to a register (steps a1 and a2), generates an intermediate instruction i20 indicating that the formal parameter p should be replaced by a temporary variable t2 (step a3), inserts the intermediate instruction i20 at the start of the intermediate program (step a4), and replaces the parts of intermediate instructions i1 and i9 that use the formal parameter p with the temporary variable t2 (step a5).

Once the processing performed by the optimizing unit 13 has been completed, the resource allocating unit 14 allocates different registers to each of a plurality of variables having overlapping live ranges. Here, when assembler statements have been expanded in the program, the resource allocating unit 14 activates the asm register detecting unit 17 before commencing its own processing.

Figure 6:
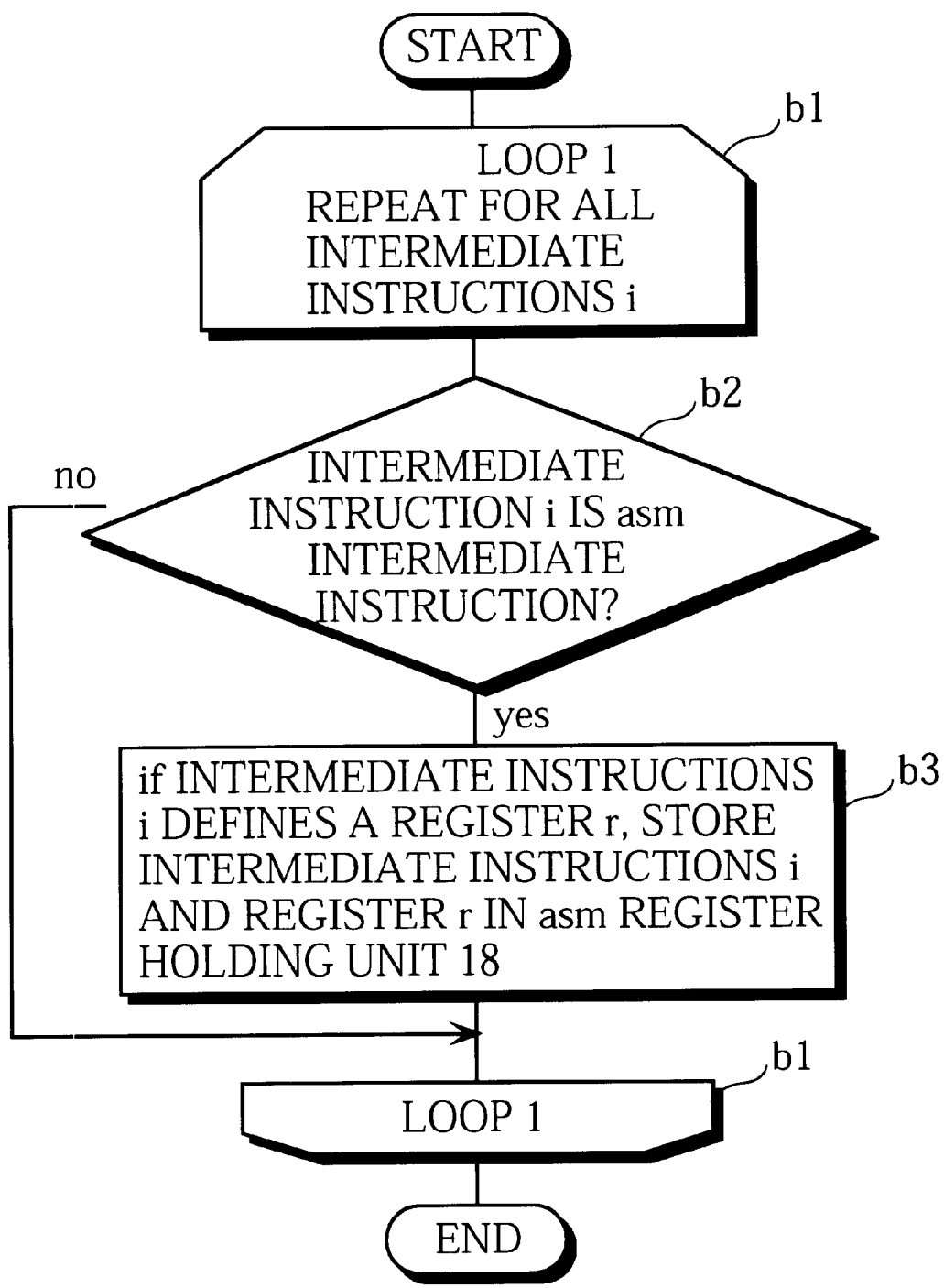
FIG. 6 is a flowchart showing the procedure performed by an asm register detecting unit 17.

When assembler statements having an attached asm keyword are included in any of the intermediate instructions in the intermediate program, the asm register detecting unit 17 detects registers defined in the assembler statements, and stores the detection result in the asm register holding unit 18. FIG. 6 is a flowchart showing the processing performed by the asm register detecting unit 17.

At step b1, the asm register detecting unit 17 performs the processing of steps b2 and b3 for all of the intermediate instructions i. Once processing has been performed for all of the intermediate instructions i, the processing performed by the asm detecting unit 17 is completed.

At step b2, when the intermediate instruction i is an asm intermediate instruction, the asm register detecting unit 17 performs the processing of step b3. When the intermediate instruction i is not an asm intermediate instruction, processing returns to step b1.

When a register r is defined in the intermediate instruction i, at step b3, the asm register detecting unit 17 stores the intermediate instruction i and the register r in the asm register holding unit 18, and processing returns to step b1.

FIG. 13 shows the content held by the asm register holding unit 18 corresponding to the intermediate program shown in FIG. 11. Registers defined in each asm intermediate instruction are held. For example, in the asm intermediate instruction i3 in FIG. 11, a value of the variable a is transferred to a register r0, thereby defining the register r0, so that the register defined by the asm intermediate instruction i3 is set as r0 (step b3).

Figure 7:
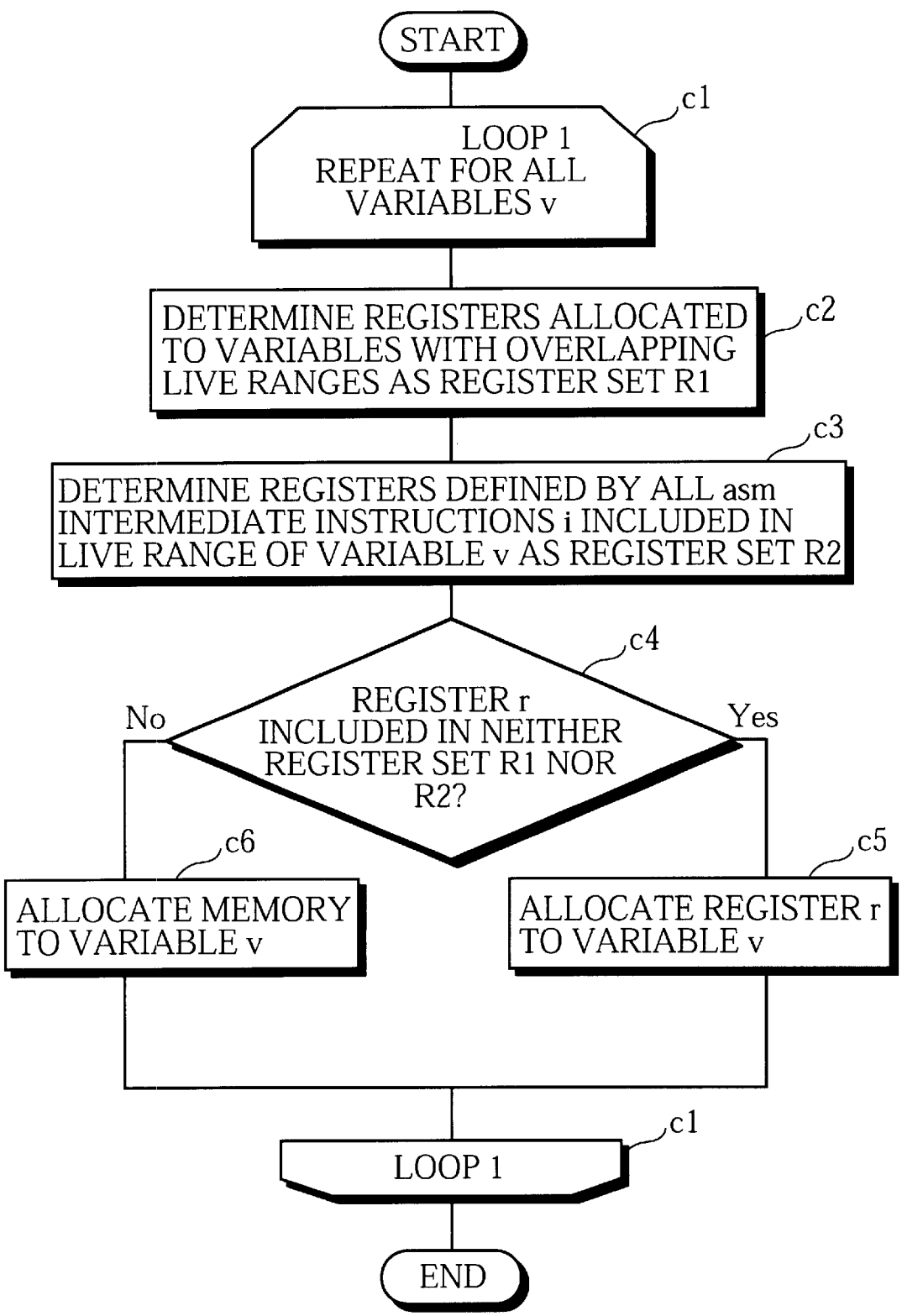
FIG. 7 is a flowchart showing the procedure performed by a resource allocating unit 14.

The resource allocating unit 14 uses control flow information and data flow information analyzed by the optimizing unit 13 to calculate live ranges for all variables, including the temporary variables generated by the register parameter replacing unit 16. The method used to calculate live ranges is the same as that explained in detail in references 1 and 2 and the like, and so explanation is here confined to showing the calculation result of live ranges for the intermediate program shown in FIG. 11. This calculation result is shown in FIG. 12. A live range is expressed conventionally as a set of intermediate instructions, as in reference 2, but here the extent of each live range is represented by a solid line to make it conceptually easier to understand. Furthermore, the reference (r0) written next to the live range for the formal parameter p signifies that register r0 is allocated to the formal parameter p. After calculating live ranges, the resource allocating unit 14 allocates resources to variables, including the temporary variables generated by the register parameter replacing unit 16. Specifically, when allocating resources to a variable, the resource allocating unit 14 allocates registers that are not allocated to variables with overlapping live ranges and that are not among registers defined by an asm intermediate instruction that have been obtained from the asm register holding unit 18. The latter condition applies only if asm statements are included in the live range of the variable. FIG. 7 is a flowchart showing the processing performed by the resource allocating unit 14.

At step c1, the resource allocating unit 14 repeats the processing of steps c2 to c6 for all variables v that have not yet been allocated a resource, and once all variables v have been allocated a resource, the processing performed by the resource allocating unit 14 is completed.

At step c2, the resource allocating unit 14 determines a register set R1, containing registers allocated to variables whose live ranges overlap with the live range of a variable v.

At step c3, the resource allocating unit 14 detects registers defined by all the asm intermediate instructions included in the live range of the variable v from the asm register holding unit 18, thereby determining a register set R2.

At step c4, the resource allocating unit 14 determines whether a register r which is not included in either register set R1 or register set R2 exists. If such a register exists, the processing of step c5 is executed, if such a register does not exist, the processing of step c6 is executed.

At step c5, the resource allocating unit 14 allocates the register r to the variable v, and processing returns to step c1.

At step c6, the resource allocating unit 14 allocates memory to the variable v, and processing returns to step c1.

The following is an explanation of the actual operation of the resource allocating unit 14, with reference to the example shown in FIG. 12. This explanation concentrates on the allocation of resources to variables a and t2. First, a register set R1, consisting of registers allocated to the variables t2, b, c and d whose live ranges overlap with the variable a, is determined. However, resources have not yet been allocated to these variables, so register set R1 is an empty set (step c2). Next, each of the asm intermediate instructions i3 to i7 included in the live range for variable a is referenced in the asm register holding unit 18 of FIG. 13, and registers r0, r1 and mdr defined in these asm intermediate instructions are fetched (step c2). A register that is not included in either of the register sets R1 and R2, for example register r2, is allocated to the variable a (step c4, c5).

The following is an explanation of the allocation of a resource to the variable t2. First, a register set R1 containing registers allocated to variables t1, a, b, c, d and e whose live ranges overlap with that of the variable t2, is determined. Here, suppose that the variables t1, b, c, d and e have not yet been allocated resources, and the variable a is allocated to the register r2 as was previously described. In this case, register r2 is fetched from the register set R1 (step c2). Next, each of the asm intermediate instructions i3 to i7 included in the live range for variable t2 is referenced in the asm register holding unit 18 of FIG. 13, and registers r0, r1 and mdr defined in these variables are fetched (step c2). A register that is not included in either of register sets R1 and R2, for example register r3, is allocated to the variable t2 (step c4, c5).

Next, the compiling device 1 activates the code generating unit 15, and converts the intermediate instructions into an object program formed from assembler statements and machine language instructions for a machine targeted by the compiler. The code generating unit 15 uses a conventional method and so detailed explanation is omitted here.

As explained above, in this embodiment, variables which are live for the extent of the asm statements, such as variables a and t2 in FIG. 12, are not allocated registers defined in the asm statements in steps c3 to c5 performed by the resource allocating unit 14. As a result, the first check operation mentioned in the Background Art section is no longer required. In addition, a temporary variable t2 is generated by the register parameter replacing unit 16 in steps a2 to a5, and registers defined in the asm statements are not allocated to the variable t2 in steps c3 to c5 performed by the resource allocating unit 14. This means that the second check operation described in the Background Art section is not required. As a result, the programmer can freely define inline assembly routines, and use such routines as black boxes at arbitrary points in the program. This greatly reduces the burden of checks placed on the programmer when using inline assembly routines, and also allows inline assembly routines to be changed to library routines, improving the reusability of the program.

Note that in step a4 of the flowchart showing the processing performed by the register parameter replacing unit 16, the generated intermediate instruction i is inserted at the start of the function, but it may also be inserted at a point in the program prior to referencing of the formal parameter p.

Second Embodiment

Figure 14:
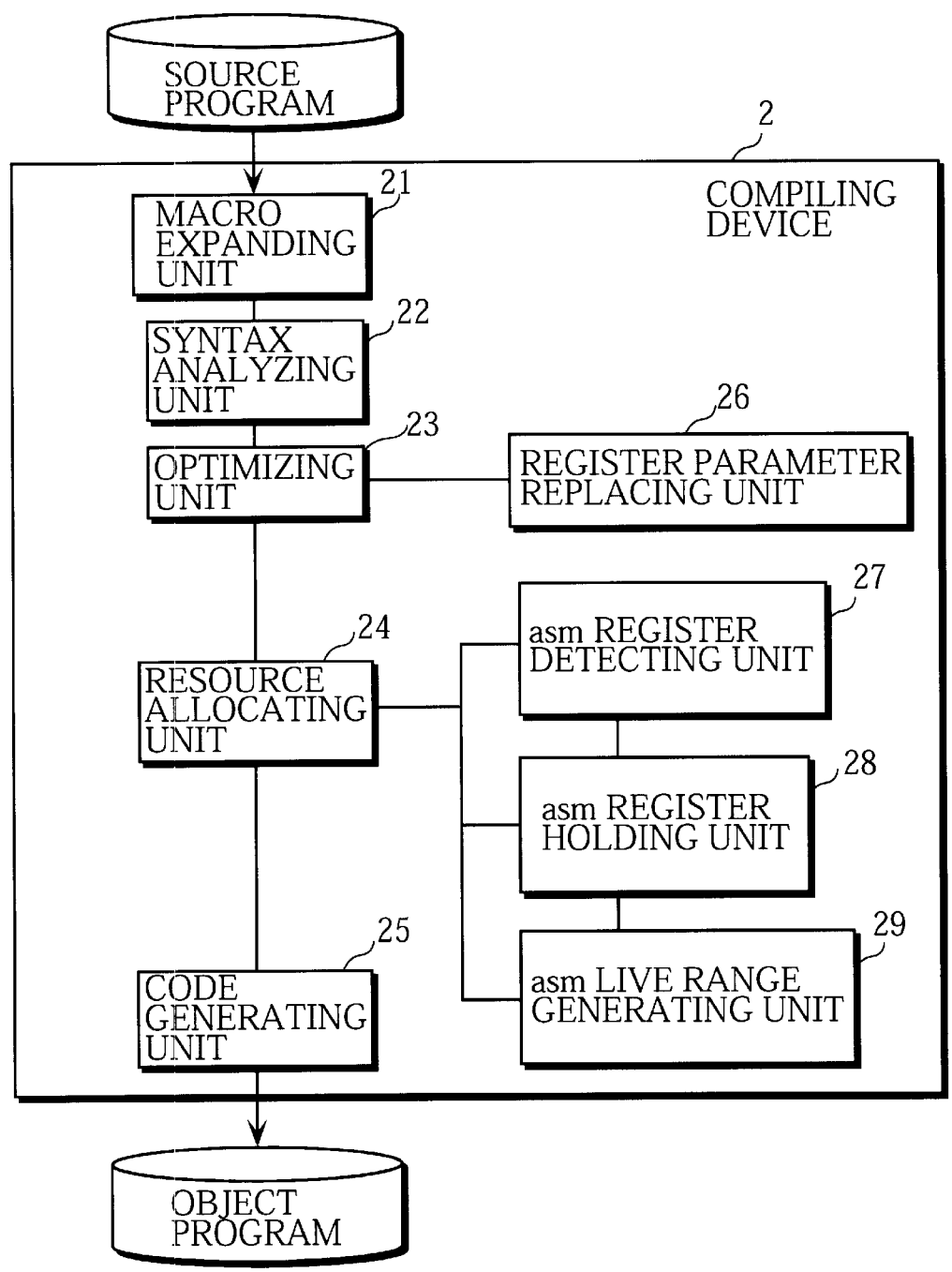
FIG. 14 is a block diagram of a compiling device 2 in a second embodiment.

FIG. 14 is a block diagram showing a compiling device 2 in a second embodiment. The compiling device 2 is formed from the main components of a conventional compiler, in other words a macro expanding unit 21, a syntax analyzing unit 22, an optimizing unit 23, a resource allocating unit 24, and a code generating unit 25, along with a register parameter replacing unit 26, an asm register detecting unit 27, an asm register holding unit 28, and an asm live range generating unit 29, that bear a particular relationship to this embodiment.

The compiling device 2 activates the macro expanding unit 21, the syntax analyzing unit 22, and the optimizing unit 23 in the same way as the compiling device 1 in the first embodiment. Here, the macro expanding unit 21, the syntax analyzing unit 22, the optimizing unit 23 and the register parameter replacing unit 26 in FIG. 14 are the same as the macro expanding unit 11, the syntax analyzing unit 12, the optimizing unit 13 and the register parameter replacing unit 16 of FIG. 4 explained in the first embodiment. Therefore, the following explanation focuses on the resource allocating unit 24, the asm register detecting unit 27, and the asm live range generating unit 29. An intermediate program generated for the example program shown in FIG. 8 resembles the one in FIG. 11 up until the end of processing performed by the optimizing unit 23.

The asm register detecting unit 27 has the same construction as the asm register detecting unit 17 of the first embodiment, and is the first component to be activated by the resource allocating unit 24. If the asm register detecting unit 17 performs detection processing on the example program shown in FIG. 11, the content shown in FIG. 13 is set in the asm register holding unit 28.

Once the asm register detecting unit 27 has performed detection processing, the resource allocating unit 24 uses the control flow information and data flow information analyzed by the optimizing unit 23 to calculate the live ranges of all of the variables. The result of processing performed on the example in FIG. 11 is the same as that explained in the first embodiment with reference to FIG. 12.

Figure 15:
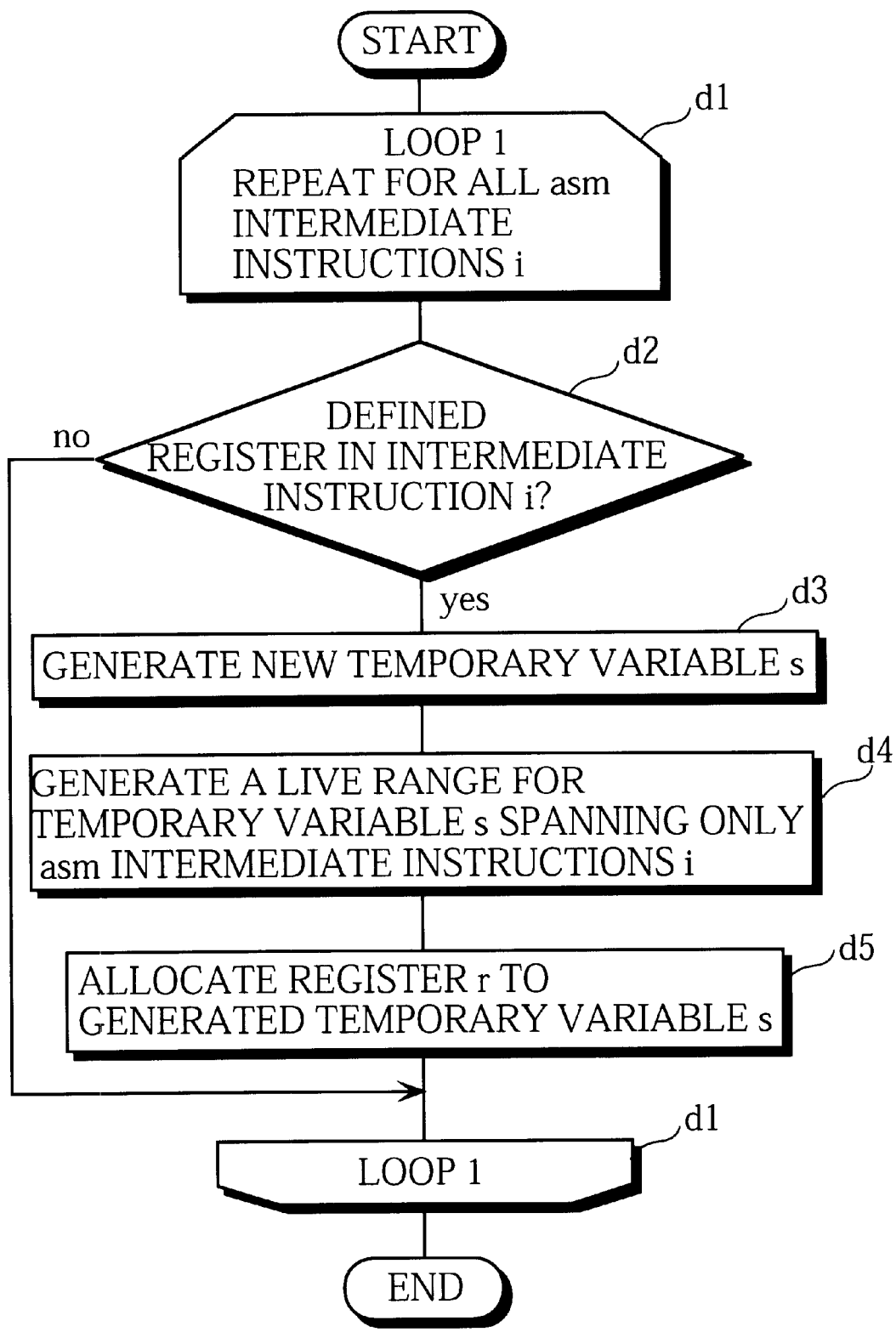
FIG. 15 is a flowchart showing the procedure performed by an asm live range generating unit 29.

Once the resource allocating unit 24 has calculated the live ranges, the asm live range generating unit 29 is activated and this unit generates temporary variables that have already been allocated to registers defined by asm statements, and live ranges corresponding to the variables. FIG. 15 is a flowchart showing the processing performed by the asm live range generating unit 29.

At step d1, the asm live range generating unit 29 repeats steps d2 to d5 for all of the asm intermediate instructions i. Once all the intermediate instructions i have been processed, the processing performed by the asm live range generating unit 29 is completed.

At step d2, if a register r defining a asm intermediate instruction i is found to exist in the asm register holding unit 28, the asm live range generating unit 29 performs steps d3 to d5, and if such an intermediate instruction is not found, processing returns to step d1.

At step d3, the asm live range generating unit 29 generates a new temporary variable s.

At step d4, the asm live range generating unit 29 generates a live range which starts and ends with asm intermediate instructions for the temporary variable s.

At step d5, the asm live range generating unit 29 allocates a register to the generated variable S, and processing then returns to step d1.

Figures 17A, 17B:
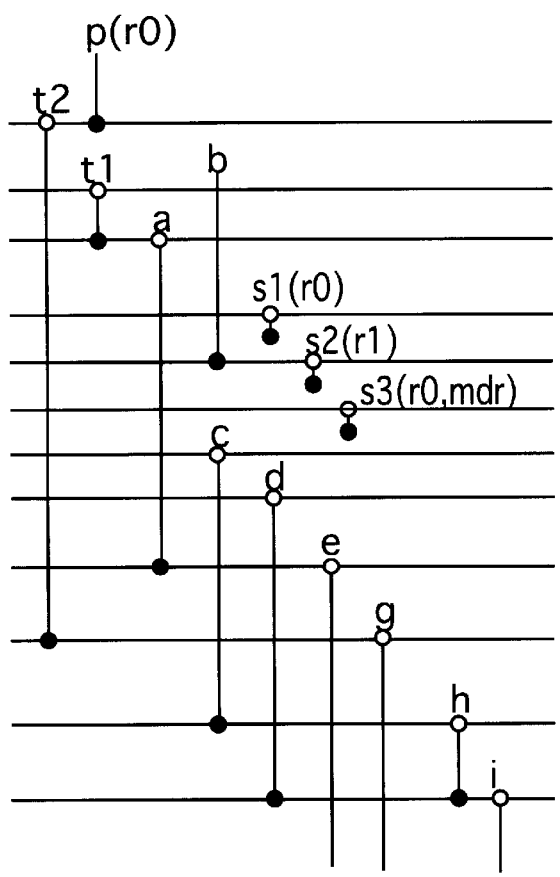
FIGS. 17A–17B shows an intermediate program and live ranges corresponding to a program after execution performed by an asm live range generating unit 29.

FIG. 17B shows the live ranges of each variable following the performance of processing by the asm live range generating unit 29. The drawing further includes temporary variables s1, s2 and s3, to which registers have been allocated, with corresponding live ranges. For example, the asm intermediate instruction i3 includes a temporary variable s1, which is allocated the register r0 defined in the asm intermediate instruction i3. A live range which covers only the asm intermediate instruction i3 is generated for the temporary variable s1.

Figure 16:
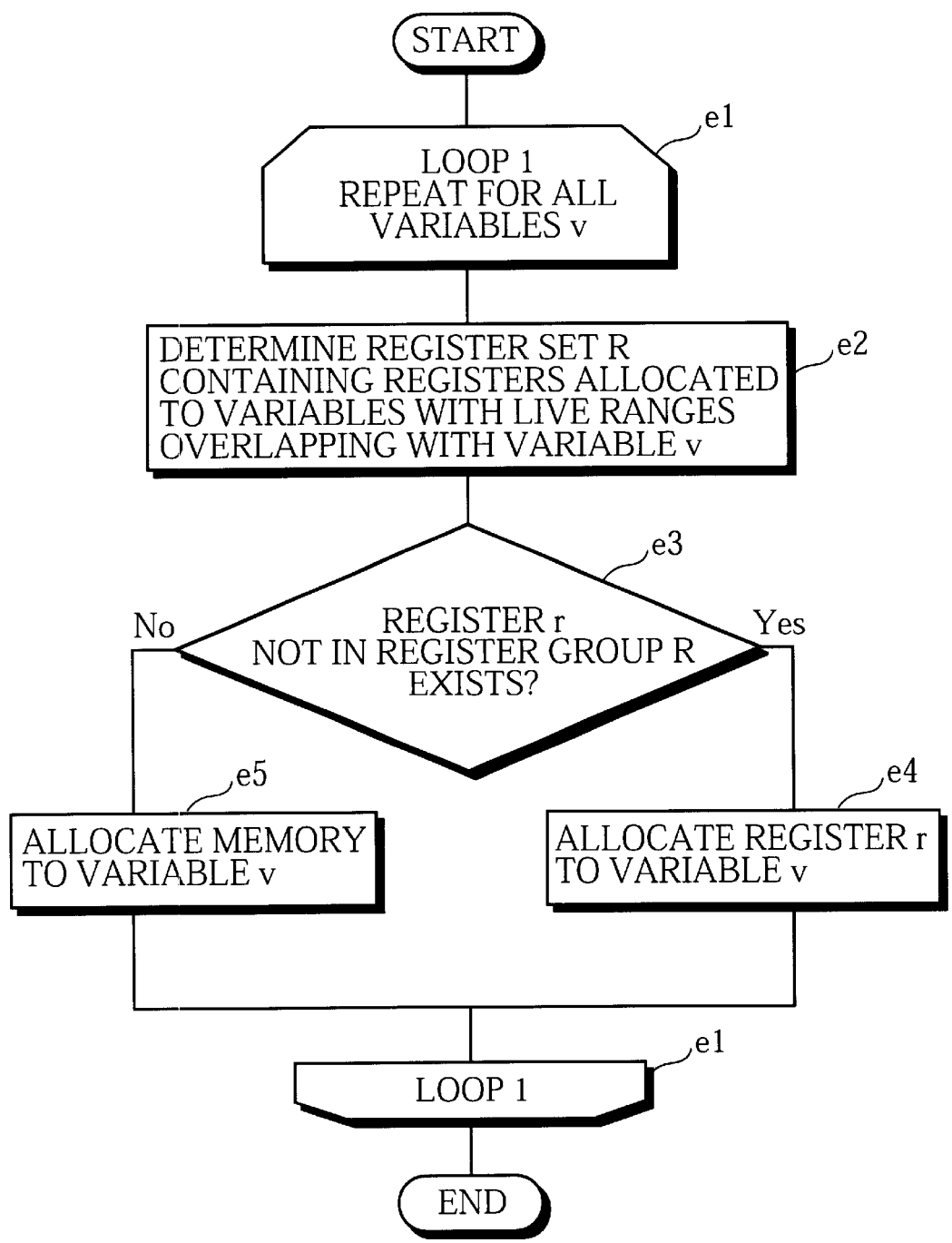
FIG. 16 is a flowchart showing the procedure performed by a resource allocating unit 24.

Next, the resource allocating unit 24 allocates resources to variables. FIG. 16 is a flowchart showing the processing performed by the resource allocating unit 24.

At step e1, the resource allocating unit 24 repeats the processing of steps e2 to e5 for all variables v that have not yet been allocated resources. Once all variables v have been processed, the processing performed by the resource allocation unit 24 is completed.

At step e2, the resource allocating unit 24 determines a register set R, containing registers allocated to variables having live ranges which overlap with that of variable v.

At step e3, the resource allocating unit 24 determines whether a register r, which does not belong to the register set R found at step e2, exists. If such a register exists, the resource allocating unit 24 executes step e4; if not, it executes step e5.

At step e4, the resource allocating unit 24 allocates the register r to the variable v, and processing returns to step e1.

At step e5, the resource allocating unit 24 allocates memory to the variable v, and processing returns to step e1.

The following is an explanation of an actual example of processing performed by the resource allocating unit 24, with reference to the example in FIG. 17. The allocation of resources to variables a and t2 is explained. Variables t2, b, c, d, s1, s2 and s3 have live ranges which overlap with that of the variable a. Of these variables, s1, s2, and s3 have been allocated registers r0, r1 and mdr respectively, so these variables are contained in the register set R (step e2). The variable a is allocated a different register, for example register r2.

Next, the allocation of a resource to the variable t2 is explained. Variables t1, a, b, c, d, e, s1, s2, and s3 have live ranges which overlap with that of the variable t2. In this case, the variables a, s1, s2 and s3 have been allocated the registers r2, r1, r0 and mdr, so the variable t2 is allocated a different register, for example register r3.

Next, the compiling device 2 activates the code generating unit 25, and converts intermediate instructions into an object program including assembler statements and machine language instructions for a machine targeted by the compiling device 2. The code generating unit 25 uses a conventional method and so is not described in detail here.

In the above embodiments, variables such as a and t2 in FIG. 17, that are live for the entire span of the asm statements are not allocated a register that is defined by the asm statements in steps e3 and e4. This effect is achieved by using the temporary variables s1, s2 and s3 generated by the asm live range generating unit 29, and removes the need for performing the first check operation described in the Background Art section. Furthermore, the variable t2 is generated in steps a2 to a5 performed by the register parameter replacing unit 16, and the variable t2 is not allocated to a register defined in the asm statements in steps e3 and e4 performed by the resource allocating unit 24. This means that the second check operation described in the Background Art section is also not required. As a result, the programmer can freely define inline assembly routine and use them as black boxes in arbitrary positions. The checks performed by the programmer when using inline assembly routines are much reduced, and inline assembly routines can be changed into a library routines, increasing the reusability of the program.

Note that the introduction of the temporary variables s generated by the asm live range generating unit 29 and generation of live ranges for these variables enables a conventional resource allocation method, such as the one described in references 2 and 3, to be applied by the resource allocating unit 24. The method described in reference 2 may be applied by using the intermediate program and live range information shown in FIG. 17. In particular, reference 2 teaches that it is possible to limit the generation of transfer instructions in the object program generated by the compiler to a bare minimum. For example, when the end point of the live range for one variable is identical to the start point of the live range for another variable, as is the case with variables b and s2 in FIG. 17, these variables are if possible allocated the same register. As a result, the variable b is allocated to register r1, and asm intermediate instruction i4 becomes a transfer within a same register, and so is deleted.

Figure 19:
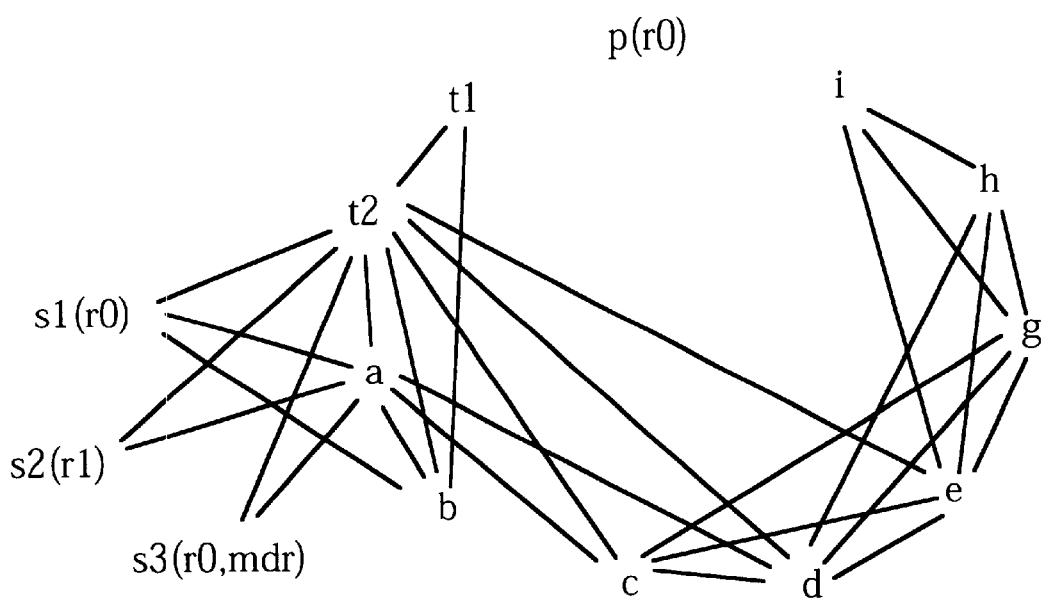
FIG. 19 shows an interference graph for variables corresponding to the live ranges shown in FIG. 17.

The extension method for graph coloring (a widely known technique) disclosed in reference 3 can be applied by constructing an interference graph like that in FIG. 19, showing overlapping live ranges between variables using the live range information of FIG. 17. In the graph in FIG. 19, variables are expressed as nodes, and variables (nodes) having overlapping live ranges are connected by edges. Some of the nodes in the graph have already been colored, that is have already been allocated a register. These are nodes (variables) s1, s2 and s3. Specifically, the method disclosed in reference 3 is a graph coloring method which can use a graph like this one in which some of the nodes have already been colored.

In the embodiments, the invention is described in relation to a division instruction, but its application is not limited to such instructions, and it may also be applied to advanced instructions for multimedia processing, such as product-sum instructions, other arbitrary instructions using calculations such as the four arithmetic fundamentals, and bit manipulation calculations, or any combination of a plurality of the above-mentioned calculations.

Furthermore, the procedure explained in the embodiments with reference to flowcharts (FIGS. 5 to 7, and FIGS. 15 and 16) is represented using a machine language program, but may equally be represented by recording such a program on a recording medium for distribution and sales. The recording medium may be an IC card, optical disk, floppy disk or similar. The machine language program recorded on such a recording medium is supplied for installation in a general-purpose personal computer. The general-purpose personal computer executes the installed machine language program in sequence, realizing the functions of the compiling device shown in the present embodiments.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed:

1. A compiling device that translates a program including assembler statements using variables into an object instruction sequence, wherein assembler instructions defining values for resources are arranged in a section of the program, and the compiling device comprises:

a variable detecting means for detecting variables whose live ranges overlap the section from variables having values defined in the assembler statements; and a resource allocating means for allocating to each variable detected by the variable detecting means, a resource different from the resources having values defined in the assembler statements.

2. The compiling device of claim 1, wherein the program is embodied by a plurality of functions, the statements are included in the functions, and assembler instructions are included at least one of the functions, and the compiling device further comprises a register parameter replacing means that, when formal parameters that should use registers exist, (1) generates substitution instructions for substituting temporary variables for the values of each formal parameter used in the functions, and inserts each of the generated substitution instructions at the start of a corresponding function, and (2) replaces all of the formal parameter values in the functions with the temporary variables indicated by the substitution instructions, and wherein:

the variable detecting means detects temporary variables whose live ranges overlap the section; and the resource allocating unit allocates a register different from the registers whose values are defined in the assembler instructions to each detected temporary variable.

3. The compiling device of claim 1, wherein the variable detecting means includes:

a detecting unit for detecting assembler instructions from the program;

a temporary variable generating unit for generating, when assembler instructions are detected, temporary variables already allocated to resources defined in the assembler instructions;

a live range setting unit setting the live range of each generated temporary variable to be equal to the section where the assembler instructions are arranged; and a variable detecting unit detecting variables whose live range overlaps the live range set for the temporary variables, wherein the resource allocating unit allocates a resource different from the resources allocated to the temporary variables to each of the detected variables.

4. The compiling device of claim 1, further comprising:

a reading means for reading a source program, including macro identifiers and statements using variables, from an external device;

a macro expanding means for expanding assembler instructions within the source program based on a macro identifier;

a syntax analyzing means for analyzing syntax of the source program including the expanded assembler instructions, and obtaining an intermediate program formed from a plurality of intermediate instructions defining values for variables; and a live range analyzing means for analyzing live ranges for variables in the plurality of intermediate instructions by analyzing the intermediate instruction defining each variable, and the last intermediate instruction to reference each variable, wherein the variable detecting means detects variables having a live range analyzed as overlapping the section, and the resource allocating means allocates registers different from the registers with values defined in the assembler instructions to the detected variables.

5. A computer readable recording medium recording a compiling program that translates a program including statements using variables into an object instruction sequence, wherein assembler instructions defining values for resources are arranged in a section of the program, and the compiling program comprises:

a variable detecting step for detecting variables whose live ranges overlap the section from variables having values defined in the statements; and a resource allocating step for allocating to each variable detected by the variable detecting step, a resource different from the resources having values defined in the assembler instructions.

6. The compiling program of claim 5, wherein the program is embodied by a plurality of functions, the statements are included in the functions, and assembler instructions are included at least one of the functions, and the compiling program further comprises a register parameter replacing step that, when formal parameters that should use registers exist, (1) generates substitution instructions for substituting temporary variables for the values of each formal parameter used in the functions, and inserts each of the generated substitution instructions at the start of a corresponding function, and (2) replaces all of the formal parameter values in the functions with the temporary variables indicated by the substitution instructions, and wherein:

the variable detecting step detects temporary variables whose live ranges overlap the section; and the resource allocating step allocates a register different from the registers whose values are defined in the assembler instructions to each detected temporary variable.

7. The compiling program of claim 5, wherein the variable detecting step includes:

a detecting step for detecting assembler instructions from the program;

a temporary variable generating step for generating, when assembler instructions are detected, temporary variables already allocated to resources defined in the assembler instructions;

a live range setting step for setting the live range of each generated temporary variable to be equal to the section where the assembler instructions are arranged; and a variable detecting step for detecting variables whose live range overlaps the live range set for the temporary variables, wherein the resource allocating step allocates a resource different from the resources allocated to the temporary variables to each of the detected variables.

8. The compiling program of claim 5, further comprising:

a reading step for reading a source program, including macro identifiers and statements using variables, from an external device;

a macro expanding step for expanding assembler instructions within the source program based on a macro identifier;

a syntax analyzing step for analyzing syntax of the source program including the expanded assembler instructions, and obtaining an intermediate program formed from a plurality of intermediate instructions defining values for variables; and a live range analyzing step for analyzing live ranges for variables in the plurality of intermediate instructions by analyzing the intermediate instruction defining each variable, and the last intermediate instruction to reference each variable, wherein the variable detecting step detects variables having a live range analyzed as overlapping the section, and the resource allocating step allocates registers different from the registers with values defined in the assembler instructions to the detected variables.

9. A translating method that translates a program including statements using variables into an object instruction sequence, wherein assembler instructions defining values for resources are arranged in a section of the program, and the translating method comprises:

a variable detecting step for detecting variables whose live ranges overlap the section from variables having values defined in the statements; and a resource allocating step for allocating to each variable detected by the variable detecting step, a resource different from the resources having values defined in the assembler instructions.

10. The translating method of claim 9, wherein the program is embodied by a plurality of functions, the statements are included in the functions, and assembler instructions are included at least one of the functions, and the translating method further comprises a register parameter replacing step that, when formal parameters that should use registers exist, (1) generates substitution instructions for substituting temporary variables for the values of each formal parameter used in the functions, and inserts each of the generated substitution instructions at the start of a corresponding function, and (2) replaces all of the formal parameter values in the functions with the temporary variables indicated by the substitution instructions, and wherein:

the variable detecting step detects temporary variables whose live ranges overlap the section; and the resource allocating step allocates a register different from the registers whose values are defined in the assembler instructions to each detected temporary variable.

11. The translating method of claim 9, wherein the variable detecting step includes:

a detecting step for detecting assembler instructions from the program;

a temporary variable generating step for generating, when assembler instructions are detected, temporary variables already allocated to resources defined in the assembler instructions;

a live range setting step for setting the live range of each generated temporary variable to be equal to the section where the assembler instructions are arranged; and a variable detecting step for detecting variables whose live range overlaps the live range set for the temporary variables, wherein the resource allocating step allocates a resource different from the resources allocated to the temporary variables to each of the detected variables.

12. The translating method of claim 9, further comprising:

a reading step for reading a source program, including macro identifiers and statements using variables, from an external device;

a macro expanding step for expanding assembler instructions within the source program based on a macro identifier;

a syntax analyzing step for analyzing syntax of the source program including the expanded assembler instructions, and obtaining an intermediate program formed from a plurality of intermediate instructions defining values for variables; and a live range analyzing step for analyzing live ranges for variables in the plurality of intermediate instructions by analyzing the intermediate instruction defining each variable, and the last intermediate instruction to reference each variable, wherein the variable detecting step detects variables having a live range analyzed as overlapping the section, and the resource allocating step allocates registers different from the registers with values defined in the assembler instructions to the detected variables.

* * * * *